United States Patent [19]

Willemin

[11] Patent Number: 4,931,248

[45] Date of Patent: Jun. 5, 1990

[54] METHOD OF MANUFACTURING AN OBJECT OF THERMOPLASTICS MATERIAL HAVING A DECORATIVE DESIGN

[75] Inventor: Albert Willemin, Le Landeron, Switzerland

[73] Assignee: ETA SA Fabriques d'Ebauches, Switzerland

[21] Appl. No.: 328,200

[22] PCT Filed: Jun. 7, 1988

[86] PCT No.: PCT/CH88/00104

§ 371 Date: Feb. 3, 1989

§ 102(e) Date: Feb. 3, 1989

[87] PCT Pub. No.: WO88/09714

PCT Pub. Date: Dec. 15, 1988

[30] Foreign Application Priority Data

Jun. 12, 1987 [FR] France .................................. 87 08261

[51] Int. Cl.$^5$ ...................... B29C 45/14; B29C 45/16
[52] U.S. Cl. ..................... 264/266; 156/232; 156/240; 264/132; 264/247; 264/259
[58] Field of Search ................... 264/328.1, 132, 46.4, 264/46.6, 259, 266, 247; 156/230, 240, 232, 277

[56] References Cited

U.S. PATENT DOCUMENTS

| | | | |
|---|---|---|---|
| 2,811,744 | 11/1957 | Baldanza | 18/5.3 |
| 3,122,598 | 2/1964 | Berger | 264/247 |
| 3,985,602 | 10/1976 | Stuart | 156/235 |
| 4,101,698 | 6/1978 | Dunning et al. | 428/31 |
| 4,330,578 | 5/1982 | Nishihira | 428/13 |
| 4,440,590 | 4/1984 | Collins et al. | 156/234 |
| 4,495,125 | 1/1985 | Hatakeyama et al. | 264/132 |

FOREIGN PATENT DOCUMENTS

| | | |
|---|---|---|
| 2011954 | 3/1970 | Fed. Rep. of Germany . |
| 2017442 | 4/1970 | Fed. Rep. of Germany . |
| 2318028 | 2/1977 | France . |
| 2373379 | 7/1978 | France . |
| 2150209 | 4/1979 | France . |
| 2521076 | 8/1983 | France . |
| 2526757 | 11/1983 | France . |
| 869416 | 5/1961 | United Kingdom . |
| 2005596 | 4/1979 | United Kingdom . |

OTHER PUBLICATIONS

Patent Abstracts of Japan, vol. 10, No. 207 (M-500) (2263), 19 Jul. 1987 & JP, A, 6147225 (Hokoku Jushi Kogyo K.K.), 7 Mar. 1986.
Patent Abstracts of Japan, vol. 10, No. 207 (M-500) (2663), 19 Jul. 1986 & JP, A, 6147224 (Hokoku Jushi Kogyo K.K.), 7 Mar. 1986.
French Search Report (FA 395076).
European Search Report (EP 88 81 0374).

*Primary Examiner*—Jan H. Silbaugh
*Assistant Examiner*—Christopher A. Fiorilla
*Attorney, Agent, or Firm*—Pollock, Vande Sande & Priddy

[57] ABSTRACT

The method includes printing a decorative design on a surface of a suitable support using a transferable ink; introducing this support into an injection mould in such a manner that, during injection, its surface carrying the decorative design faces the inside of the mould; and injecting into the mould a heated thermoplastics material for forming an object. To prevent the printed design from being deformed by molten thermoplastics material during injection, the method further includes introducing a separate film into the mould, before injection, in such a manner that it is applied against the surface of the support printed with the decorative design. The film is made of a material which bonds with the injected thermoplastics material and receives and retains the ink forming the decorative design, which separates from the support and deposits on the film during injection.

4 Claims, No Drawings

METHOD OF MANUFACTURING AN OBJECT OF THERMOPLASTICS MATERIAL HAVING A DECORATIVE DESIGN

RELATED APPLICATIONS

This application corresponds to International Application No. PCT/CH88/00104, which was filed June 7, 1988, and designated the United States.

TECHNICAL FIELD

The present invention concerns a method of manufacturing an object of thermoplastics material having a decorative design, said method comprising: printing said design onto a surface of a support using a transferable ink able to separate from said support in response to heating; introducing said support, after said printing, into a mould having the shape and dimensions of said object; and, after said introduction, injecting said thermoplastics material into said mould, said introduction of said support being carried out so that, at least during said injection, said support is applied against a wall of said mould with said surface turned facing the inside of said mould, and said injection being carried out while said thermoplastics material is at a temperature equal to or greater than its melting point.

BACKGROUND OF THE INVENTION

Very many objects made of a thermoplastics material are provided with a decorative design, and it is not possible to enumerate them all here.

These objects are very often manufactured by injecting a suitable thermoplastics material into a mould, the decorative design being applied onto the chosen location of the external surface of the object by any one of well known printing techniques such as silk-screen printing or flexographic printing.

Objects manufactured this way have the drawback that if they are subjected to rubbing during use, the decorative design they carry is easily scratched or even rubbed off.

U.S. Pat. No. 2,811,744 describes a method which avoids this drawback. According to this method, the thermoplastics material is injected directly onto a piece of paper carrying the decorative design printed with a transferable ink, i.e. able to separate from the paper in response to heating, this paper having been previously placed at the desired location in the injection mould.

During the injection, the transferable ink separates from the paper and adheres to the thermoplastics material and, after cooling of the latter, the design is placed on the surface of the object.

However, with this method, there is a substantial risk that the decorative design is deformed or even completely spoiled due to the fact that the molten thermoplastics material moves against the paper during injection.

Moreover, this method is not suitable for manufacturing objects of a thermoplastics material that is flexible at its normal use temperature, because the ink used to form the decorative design diffuses quite easily into such material. The decorative design therefore quite quickly loses its sharpness, which is obviously not desirable.

Also, if this method is used to manufacture objects of a thermoplastics material that is hard at its normal use temperature, the ink forming the decorative design would not diffuse into this material and, even though it is not liable to be deformed by such diffusion, the decorative design would nevertheless be liable to be damaged, or even completely erased, by any rubbing that the object may be subjected to. It is therefore necessary in this instance to protect the decorative design by covering it with a transparent layer of lacquer or plastics material after removal of the object from the injection mould, as is described in the already-mentioned U.S. Pat. No. 2,811,744. The application of this protective layer constitutes an additional operation which complicates the method and makes it more expensive.

DISCLOSURE OF THE INVENTION

An object of the present invention is to propose a method of manufacturing an object of injected thermoplastics material with which the decorative design is in no case deformed by the movement of this thermoplastics material in the injection mould.

Another object of the present invention is to propose such a method in which the danger of seeing the decorative design lose its sharpness after some time as a result of diffusion of the ink forming the design into the thermoplastics material of the object when this material is flexible, and the danger of seeing the decorative design damaged or even destroyed by any rubbing that the object may be subjected to when the material thereof is hard, may be avoided when necessary.

These objects are achieved by the claimed method.

As in the method described in the above-mentioned U.S. Pat. No. 2,811,744, the method according to the invention includes printing the design intended to decorate the object onto one surface of a suitable support made of a sheet of paper or plastics material using a transferable ink. This printing, as well as the supports and the inks that can be used to carry it out, are well known and will not be described in further detail here.

Preferably, the dimensions of this support sheet are substantially greater than those of the part of the object to be decorated, and several decorative designs are printed side by side on this sheet. The latter is then cut into pieces each carrying a single decorative design and each having dimensions adapted to those of the part of the object to be decorated.

One of the pieces of the support sheet is then introduced into a conventional injection mould whose walls define, when the mould is closed, a cavity having the shape and dimensions of the object to be manufactured.

This piece of the support sheet is of course introduced into this mould while the latter is open. It is placed in this mould in such a manner that, during injection of the thermoplastics material of the object to be produced in a later step of the method, it will be applied by the pressure of the material against the wall of the mould and that the decorative design will be located where it should be on the finished object. Also, this piece of the support sheet is introduced in such a manner that, during injection of the thermoplastics material of the object, its face carrying the decorative design will be turned facing the inside of the mould.

While the mould is still open, a film of material of a kind to be specified hereinbelow is then introduced into this mould in such a manner that during injection of the thermoplastics material of the object, which is carried out afterwards, it will be applied by the pressure of the material against the surface of the piece of the support sheet carrying the decorative design.

The injection mould is then closed and the thermoplastics material of the object is injected in a conventional way which will not be described in detail here.

During this injection, the thermoplastics material of the object, which is obviously at a temperature equal to or above its melting point, heats the film and, through it, the ink forming the decorative design carried by the piece of the support sheet.

In response to this heating, this ink detaches from its support and deposits on the film or even, in some cases, penetrates into this film in a manner described below.

It can be seen that in the present method, unlike what takes place in the method described in the above-mentioned U.S. Pat. No. 2,811,744, the ink forming the decorative design is not in direct contact with the molten thermoplastics material that moves in the mould during its injection. This ink is therefore not liable to be taken up in this movement.

As moreover the film and the ink's support are stationary relative to one another, the decorative design is transferred onto the film without any distortion.

After the above-mentioned injection, the mould is of course opened and the finished object is removed therefrom.

The thermoplastics material intended to be injected into the mould is of course selected in dependence on the physical and chemical properties that the object must have, and the selection of this material of course determines the temperature at which it is injected into the mould.

This selection also determines to a certain degree the selection of the material of the film.

The latter material must be selected such that it can strongly bond to the material injected into the mould, so that the film carrying the decorative design will not become detached from the object even a long time after its manufacture.

This bonding may advantageously be obtained by selecting the material of the film so that its molecules are capable of chemically bonding with those of the injected material while the latter is at its injection temperature.

This bonding can also be obtained by selecting the material of the film so that a macromolecular interdiffusion phenomenon can occur between this material and the material injected into the mould. This macromolecular interdiffusion phenomenon is well known to specialists and will not be described here.

It is of course not possible to list here all of the thermoplastics materials that may be injected into a mould along with all of the materials that can bond with each one of these and can therefore be selected for the film. This list is also unnecessary as all of these materials and their properties are well known to specialists.

It may simply be mentioned that the applicant has obtained excellent results using as injected material a polyether-block-amide comprising about 50% polyether and 50% amide and, for the film, another polyether-block-amide comprising about 30% polyether and 70% amide, or a polyamide.

It should also be noted that the material of the film must also be so selected that the ink forming the decorative design may firmly affix itself to this film but that the support on which the design is originally printed does not stick to this film and may easily be removed when the object is taken out of the mould after the injection operation.

It is once again neither possible nor necessary to list here, for each type of ink and/or support, all of the materials which fulfill the last-mentioned conditions and may therefore be selected for the film.

Suffice it to say that very good results have been obtained in instances where the ink forming the decorative design is a sublimable ink and the material of the film is a thermoplastics material.

In such cases, when the ink is heated, through the film, by the thermoplastics material during the injection thereof, it vaporises.

As the film itself is also heated, this vaporized ink diffuses quite rapidly into the material of this film.

But as soon as the injection operation is over, the temperature of the film drops and this diffusion of the ink stops or at least slows down very considerably.

In practice, this rapid diffusion lasts for only a few seconds. During this short period, diffusion takes place only in a direction perpendicular to the surface of the film and to a depth, from this surface, not exceeding a few tens of micrometers.

The decorative design formed by this ink after this diffusion is therefore identical, but turned by 180°, to the design that was printed on the paper, and it is perfectly visible even if the material of the film is not completely transparent.

Also, despite the small depth of diffusion of the design-forming ink, the design is perfectly protected against any damage caused by possible rubbing against the finished object.

It should be remarked that the diffusion of a sublimable ink into a thermoplastics material never stops completely, but continues at a very low speed that depends on the nature of this material and its temperature.

If the decorative design is deliberately rather unsharp and/or if the useful lifetime of the object is relatively short, this slow diffusion of the ink into the material of the film can be disregarded.

If however the decorative design has well defined surfaces or lines and/or if the lifetime of the object must be quite long, this slow diffusion should be avoided as far as possible.

The applicant had found that, for this, a thermoplastics material must be selected for the film that has a hardness that is all the greater when the speed of this diffusion must be slow. In practice, if a thermoplastics material having a Shore-D hardness greater than 50 is selected for the film, the speed of this diffusion becomes so slow that, even if an object manufactured according to the present method is sometimes submitted to a temperature of 50° to 60° C., the effect of this diffusion on the decorative design will still be imperceptible two to three years after manufacture of the object.

It should be noted that if the object manufactured by means of the present method is not intended to be deformed, i.e. if the injected thermoplastics material is hard at the normal use temperature of the object, the thickness of the film carrying the decorative design can be chosen very freely.

But if this object must be easily deformable, i.e. if the injected thermoplastics plastics material is flexible at the normal use temperature of the object, the thickness of the film should be selected as thin as possible so as not to impede deformation of the object. This condition is however generally very easy to fulfill.

I claim:

1. A method of manufacturing an object of thermoplastics material having a decorative design, said method comprising: printing said design onto a surface of a support using a transferable ink separable from said support in response to heating; introducing said support, after said printing, into a mould having the shape and dimensions of said object; introducing a separate film into the mould in a position to be applied against said printed surface of the support; and after introducing said support and said film, injecting said thermoplastics material into said mould at a temperature equal to or greater than its melting point; said introduction of said support being carried out so that, at least druing said injection, said support is applied against a wall of said mould with said printed surface turned facing the inside of the mould; said introduction of said film being carried out so that, at least during said injection, one surface of said film is applied against said printed surface of the support and the other surface of said film bonds itself to said thermoplastics material while the latter is at the temperature it has during said injection; and said transferable ink separating from said support and being deposited on and retained by said film in response to said ink being heated through said film by said injected thermoplastics material.

2. A method according to claim 1, wherein said ink is a sublimable ink which vaporizes in response to said heating, and wherein said film comprises a thermoplastics material.

3. A method according to claim 2, wherein said thermoplastics material of said film has a Shore-D hardness greater than or equal to 50.

4. A method according to claim 1 wherein, after said injection, said object is taken out of the mould and said support for the ink is removed therefrom.

* * * * *

UNITED STATES PATENT AND TRADEMARK OFFICE
CERTIFICATE OF CORRECTION

PATENT NO. : 4,931,248

DATED : June 5, 1990

INVENTOR(S) : Albert Willemin

It is certified that error appears in the above-identified patent and that said Letters Patent is hereby corrected as shown below:

Column 5, line 11, change "druing" to --during--.

Signed and Sealed this

Thirteenth Day of August, 1991

*Attest:*

HARRY F. MANBECK, JR.

*Attesting Officer*  *Commissioner of Patents and Trademarks*